(12) United States Patent  
Dearborn (10) Patent No.: US 8,339,113 B2  
(45) Date of Patent: Dec. 25, 2012

(54) BUCK SWITCH-MODE POWER CONVERTER LARGE SIGNAL TRANSIENT RESPONSE OPTIMIZER

(75) Inventor: Scott Dearborn, Brackney, PA (US)

(73) Assignee: Microchip Technology Incorporated, Chandler, AZ (US)

( * ) Notice: Subject to any disclaimer, the term of this patent is extended or adjusted under 35 U.S.C. 154(b) by 232 days.

(21) Appl. No.: 12/839,012

(22) Filed: Jul. 19, 2010

(65) Prior Publication Data

US 2012/0013322 A1 Jan. 19, 2012

(51) Int. Cl.
*G05F 1/656* (2006.01)
*G05F 1/56* (2006.01)

(52) U.S. Cl. ........ 323/222; 323/351; 323/282; 323/283; 323/284; 323/285

(58) Field of Classification Search .................. 323/222, 323/351, 282, 283, 284, 285, 286
See application file for complete search history.

(56) References Cited

U.S. PATENT DOCUMENTS

| | | | | |
|---|---|---|---|---|
| 5,742,151 | A | | 4/1998 | Hwang ........................ 323/222 |
| 5,912,552 | A | * | 6/1999 | Tateishi ....................... 323/285 |
| 6,348,780 | B1 | * | 2/2002 | Grant ........................... 323/222 |
| 6,396,251 | B2 | * | 5/2002 | Corva et al. .................. 323/283 |
| 6,433,525 | B2 | * | 8/2002 | Muratov et al. .............. 323/282 |
| 6,580,258 | B2 | * | 6/2003 | Wilcox et al. ................ 323/282 |
| 6,703,812 | B1 | * | 3/2004 | Lethellier ..................... 323/222 |
| 6,885,175 | B2 | * | 4/2005 | Mihalka ....................... 323/282 |
| 6,933,706 | B2 | * | 8/2005 | Shih ............................. 323/222 |
| 7,423,856 | B2 | * | 9/2008 | Matyas .......................... 361/90 |
| 7,486,529 | B2 | * | 2/2009 | Sukup ........................... 363/49 |
| 7,623,361 | B2 | * | 11/2009 | Basso et al. ................... 363/49 |
| 7,782,036 | B1 | * | 8/2010 | Wong et al. .................. 323/282 |
| 8,008,902 | B2 | * | 8/2011 | Melanson et al. ........... 323/285 |
| 8,054,056 | B2 | * | 11/2011 | Coleman ...................... 323/282 |
| 2002/0158613 | A1 | * | 10/2002 | Muratov et al. .............. 323/284 |
| 2009/0309561 | A1 | | 12/2009 | Chen et al. ................... 323/282 |
| 2009/0322300 | A1 | * | 12/2009 | Melanson et al. ........... 323/284 |

OTHER PUBLICATIONS

TPS5615, TPS5618, TPS5625, TPS5633 Synchronous-Buck Hysteretic Regulator Controller; Texas Instruments, www.ti.com/lit/ds/slvs177b/slvs, XP55034195; pp. 1-28, Jul. 1, 2000.
International PCT Search Report, PCT/US2011/044029, 13 pages, Mailed Aug. 6, 2012.

* cited by examiner

*Primary Examiner* — Bao Q Vu
(74) *Attorney, Agent, or Firm* — King & Spalding L.L.P.

(57) ABSTRACT

A switch mode power supply (SMPS) response to a disturbance is improved by using a hysteretic control in combination with a fixed frequency, pulse-width modulated (PWM) controller for providing robust control and optimizing the response to disturbances in buck or buck derived switch mode power supply (SMPS) system topologies.

10 Claims, 12 Drawing Sheets

FIG. 11 — TRADITIONAL PWM CONTROL LOOP RESPONSE MAGNIFIED

BUCK SWITCH-MODE POWER CONVERTER LARGE SIGNAL TRANSIENT RESPONSE OPTIMIZER

TECHNICAL FIELD

The present disclosure relates to switch mode power supplies, and, more particularly, to improving large signal transient response of a buck switch-mode power supply (SMPS) by using hysteretic control in combination with pulse-width modulation (PWM) control of the SMPS.

BACKGROUND

The optimum response to a disturbance in any negative feedback control system is achieved with a hysteretic control. However, many systems cannot tolerate the variable frequency or increased ripple present in a strictly hysteretic controlled system. Prior technology has implemented control techniques such as dual edge modulation, or increasing the bandwidth of the control system, but the response to a large disturbance is not optimized using these control techniques. In addition, using these control techniques during normal operation of the system generally results in reduced phase margin and stability concerns. What is needed is a better way to improve a SMPS system's response to a disturbance.

SUMMARY

Therefore it is desirable to optimize the SMPS system's response to a disturbance by using a hysteretic control in combination with a fixed frequency, pulse-width modulated (PWM) control for providing robust control and optimizing the response to disturbances in buck or buck derived SMPS system topologies.

According to a specific example embodiment of this disclosure, a switch mode power supply (SMPS) controller using hysteretic control in combination with pulse-width modulation (PWM) control comprises: a hysteretic control circuit having a first input coupled to a reference voltage, a second input coupled to a feedback voltage representing a load side output voltage of a switch mode power supply (SMPS), a first output for controlling a high side hysteretic demand, and a second output for controlling a low side hysteretic disable; a PWM error generator having a third input coupled to the reference voltage, a fourth input coupled to the feedback voltage, a fifth input coupled to a current sense circuit, and a third output for controlling PWM demand; and a power circuit driver having a high side (HS) power control output, and a low side (LS) power control output, the HS and LS power control outputs are adapted to drive power switches of a switch mode power supply (SMPS), the third output of the PWM error generator is coupled to the power circuit driver for control thereof, and the first and second outputs of the hysteretic control circuit are coupled to the power circuit driver for further control thereof; the PWM error generator third output controls the power circuit driver to make the feedback voltage substantially equal to the reference voltage unless a difference between the feedback voltage and the reference voltage is greater than at least a predetermined value, wherein if the feedback voltage is greater than the reference voltage by at least the predetermined value, then the hysteretic control circuit forces the HS and LS power control outputs to an off-state, if the feedback voltage is less than the reference voltage by at least the predetermined value, then the hysteretic control circuit controls a duty cycle of the HS and LS power control outputs so as to control the difference between the reference voltage and the feedback voltage to less than the predetermined value, and thereafter the PWM error generator will additionally control the HS and LS power control outputs so as to force the difference between the reference voltage and the feedback voltage to substantially zero over a certain time period.

According to another specific example embodiment of this disclosure, a method for controlling a switch mode power supply (SMPS) using hysteretic control in combination with pulse-width modulation (PWM) control comprises: determining a voltage difference between a reference voltage and a feedback voltage with a hysteretic control circuit and a PWM error generator, the feedback voltage being representative of an output voltage of a switch mode power supply (SMPS); controlling power switches of the SMPS with the PWM error generator when the voltage difference is less than a predetermined value, and controlling the power switches of the SMPS with the hysteretic control circuit when the voltage difference is equal to or greater than the predetermined value until the PWM error generator has time to reduce the voltage difference to less than the predetermined value. Wherein the step of controlling the power switches of the SMPS with the hysteretic control circuit and the PWM error generator comprises; a) determining whether the feedback voltage is greater than the reference voltage by at least the predetermined value, and if so b) forcing the power switches of the SMPS to an off-state with the hysteretic control circuit; c) determining whether the feedback voltage is less than the reference voltage by at least the predetermined value, and if so d) controlling a duty cycle of the power switches with the hysteretic control circuit so that the difference between the reference voltage and the feedback voltage is maintained at less than the predetermined value, and thereafter e) additionally controlling the power switches with the PWM error generator so as to force the difference between the reference voltage and the feedback voltage to substantially zero over a certain time period; and f) returning to step a).

BRIEF DESCRIPTION OF THE DRAWINGS

A more complete understanding of the present disclosure thereof may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

In a general sense, a power converter can be defined as a device which converts one form of energy into another on a continuous basis. Any storage or loss of energy within such a power system while it is performing its conversion function is usually identical to the process of energy translation. There are many types of devices which can provide such a function with varying degrees of cost, reliability, complexity, and efficiency.

The mechanisms for power conversion can take many basic forms, such as those which are mechanical, electrical, or chemical processing in nature. The focus of herein will be on power converters which perform energy translation electrically and in a dynamic fashion, employing a restricted set of components which include inductors, capacitors, transformers, switches and resistors. How these circuit components are connected is determined by the desired power translation. Resistors introduce undesirable power loss. Since high efficiency is usually an overriding requirement in most applications, resistive circuit elements should be avoided or minimized in a main power control path. Only on rare occasions and for very specific reasons are power consuming resistances introduced into the main power control path. In auxiliary circuits, such as sequence, monitor, and control electronics of total system, high value resistors are common place, since their loss contributions are usually insignificant.

Figure 1:
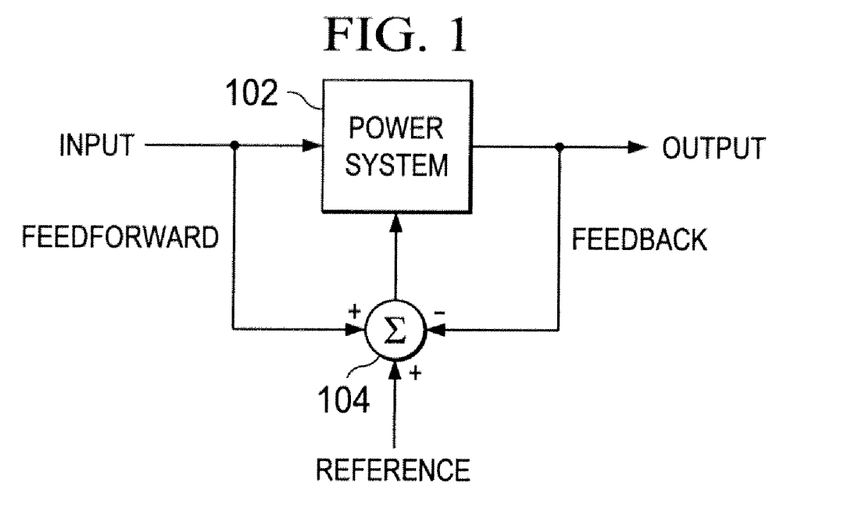
FIG. 1 illustrates a schematic block diagram of a basic regulator system.

Referring to FIG. 1, depicted is a schematic block diagram of a basic regulator system. A power system 102, e.g., a basic switch-mode power converter where an input of an uncontrolled source of voltage (or current, or power) is applied to the input of the power system 102 with the expectation that the voltage (or current, or power) at the output will be very well controlled. The basis of controlling the output is some form of reference, and any deviation between the output and the reference becomes an error. In a feedback-controlled system, negative feedback is used to reduce this error to an acceptable value, as close to zero required by the system. It is desirable, typically, to reduce the error quickly, but inherent with feedback control is the trade-off between system response and system stability. The more responsive the feedback network is, the greater becomes the risk of instability.

At this point, it should be mentioned that there is another method of control—feed forward. With feed forward control, a control signal is developed directly in response to an input variation or perturbation. Feed forward is less accurate than feedback since output sensing is not involved, however, there is no delay waiting for an output error signal to be developed, and feed forward control cannot cause instability. It should be clear that feed forward control typically is not adequate as the only control method for a voltage regulator, but it is often used together with feedback to improve a regulator's response to dynamic input variations.

Figure 2:
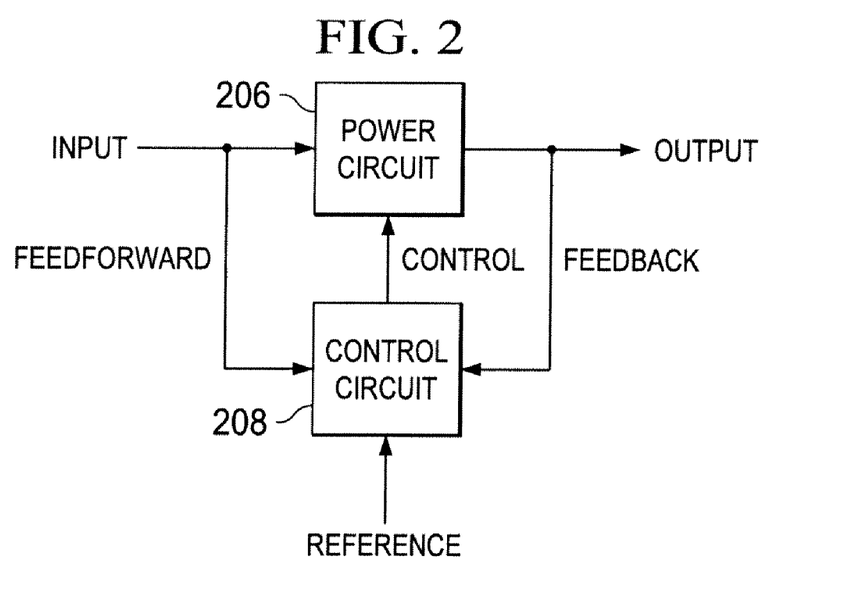
FIG. 2 illustrates a more detailed schematic block diagram of the general power regulator shown in FIG. 1.

Referring to FIG. 2, depicted is a more detailed schematic block diagram of the general power regulator shown in FIG. 1. The power system 102 has been separated into two blocks: the power circuit 206 and the control circuit 208. The power circuit 206 handles the power system load current and is typically large, robust, and subject to wide temperature fluctuations. Its switching functions are by definition, large-signal phenomenon, normally simulated in most stability analyses as just a two-state switch with a duty cycle. The output filter (not shown) is also considered as a part of the power circuit 206, but can be considered as a linear block. The control circuit 208 will normally be made up of a gain block, an error amplifier, and a pulse-width modulator, used to define the duty cycle for the power switches. According to the teachings of this disclosure, the control circuit 208 is optimized to respond to a disturbance in the power system 102.

Figure 3:
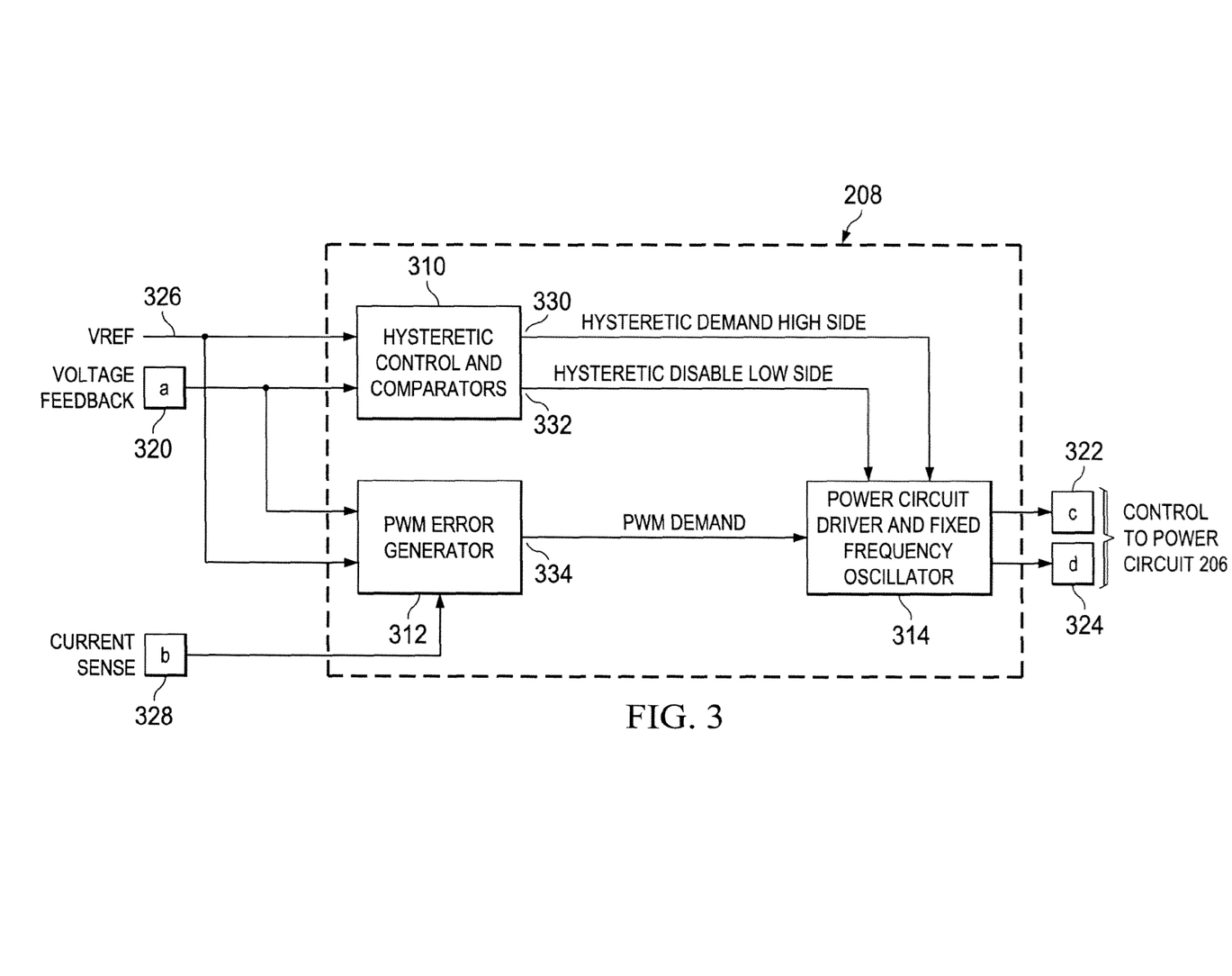
FIG. 3 illustrates a schematic block diagram of a control circuit, according to the teachings of this disclosure.
Figure 4:
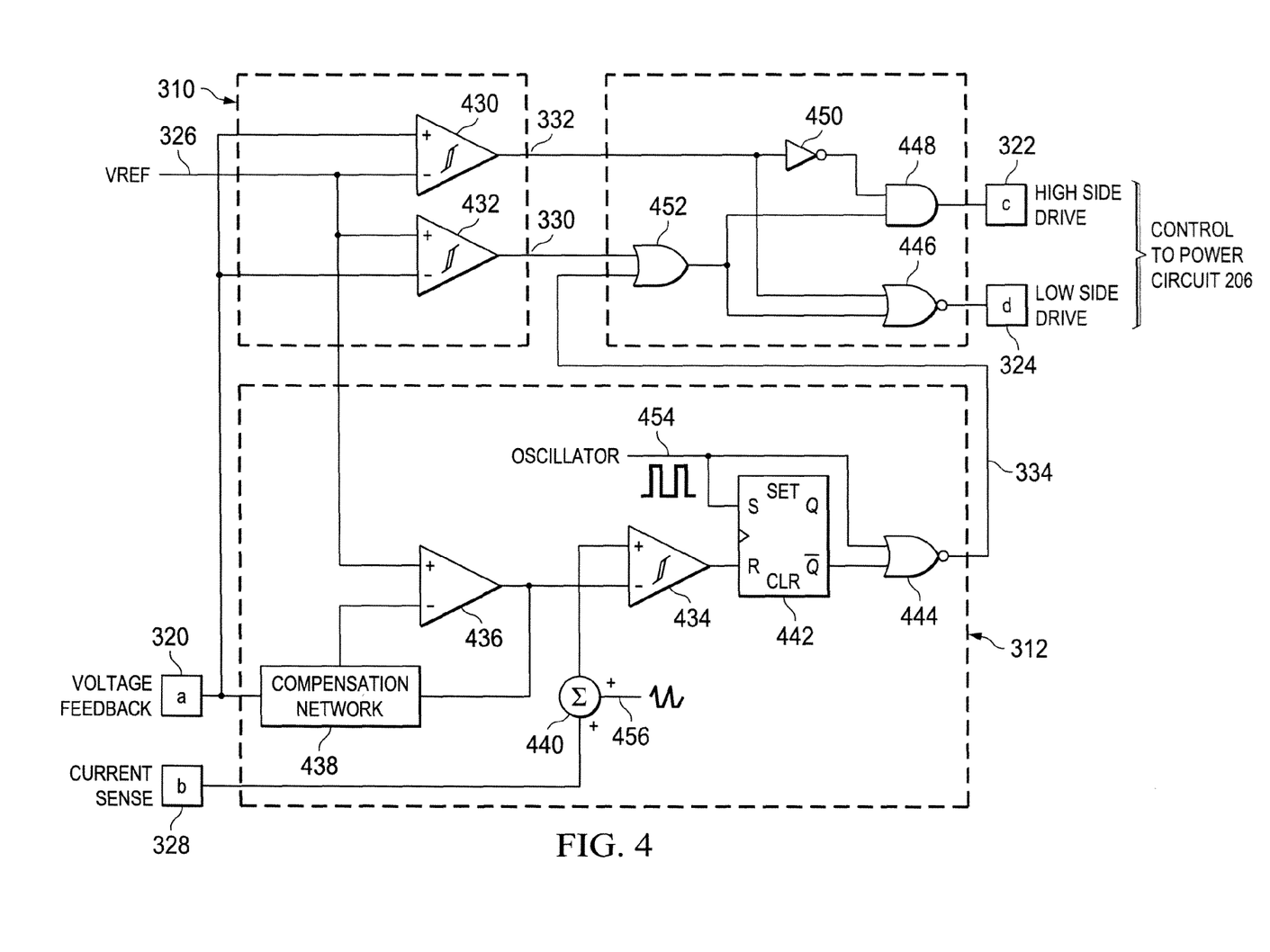
FIG. 4 illustrates a schematic diagram of a detailed implementation of the control circuit shown in FIG. 3, according to a specific example embodiment of this disclosure.

Referring now to FIGS. 3 and 4, depicted in FIG. 3 is a schematic block diagram of a control circuit, according to the teachings of this disclosure, and depicted in FIG. 4 is a schematic diagram of a detailed implementation of the control circuit shown in FIG. 3, according to a specific example embodiment. A traditional peak current mode PWM control is combined with a fast outer hysteretic control for operating a synchronous buck SMPS (see FIG. 5). In the presence of a disturbance that significantly deviates the feedback from the set-point or reference, the fast hysteretic control contains the deviation to a predefined level. The slower PWM control loop then drives the error or deviation to zero in a normal fashion.

An output voltage feedback signal at node 320 and a reference voltage at node 326 are presented to a fixed frequency PWM error generator 312. A control voltage from the output of operational amplifier 436 results and which establishes a peak current demand necessary to produce a substantially zero-volt differential between the signals at nodes 320 and 326. This control voltage is presented to the inverting input of the PWM comparator 434. The non-inverting input of the PWM comparator 434 is presented with the summation (via summer 440) of the current sense signal received at node 328 and a slope compensation ramp signal 456. A clock oscillator signal 454 from a fixed frequency oscillator (not shown) establishes the switching frequency, maximum duty cycle, and start of the energy transfer cycle. The output from the PWM comparator 434 terminates the PWM demand on a cycle-by-cycle basis. Flip-flop 442 holds the demand off until the start of the next cycle established by the clock oscillator signal 454. The PWM error generator 312 produces a fixed frequency PWM demand of a traditional closed loop, negative feedback control system. In steady-state operation or during small perturbations of the SMPS system, the PWM demand directly controls the high side (HS) drive and low side (LS) drive outputs to nodes 322 and 324, respectively (PWM demand is the percent of time the HS drive and/or LS drive outputs are in the on-state). The output voltage feedback signal at node 320 and the reference voltage at node 326 are also presented to a fast, robust outer hysteretic control block 310. During dynamic conditions, e.g., a significant change in load current and/or source voltage, the differential voltage between the signals received at nodes 320 and 326 will deviate from zero.

The PWM error generator 312 requires a finite amount of time to drive this differential voltage back to zero. If the voltage feedback at node 320 drops below the reference voltage at node 326 by a predetermined amount, the fast hysteretic control will asynchronously control the duty cycle of the HS drive output at node 322 and the LS drive output at node 324. As a result, the differential voltage is limited to a certain controlled level. After a finite amount of time, the PWM error generator 312 drives this deviation back to zero. If the voltage feedback at node 320 rises above the reference voltage at node 326 by a predetermined amount, the fast hysteretic control 310 asynchronously forces both the HS drive output at node 322 and the LS drive output at node 324 to off-states. By forcing the HS drive output at node 322 into the off-state, no additional or unwanted energy is stored in the inductor 542 (see FIG. 5). By forcing the LS drive output at node 324 into the off-state, the forcing function or voltage across the inductor 542 is increased, thereby causing a faster decay in any energy stored therein. After a finite amount of time, the PWM error generator 312 will drive the deviation back to substantially zero.

Figure 5:
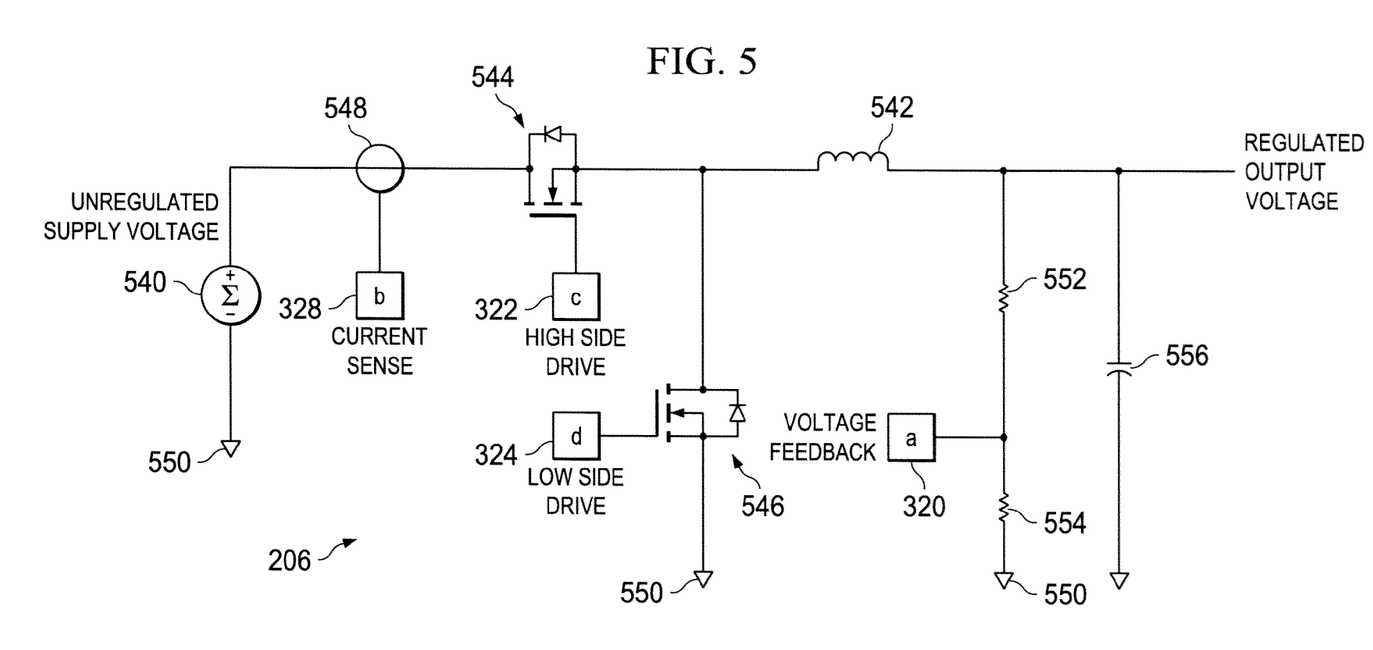
FIG. 5 illustrates a schematic diagram of a synchronous buck SMPS power circuit controlled by the control circuit shown in FIGS. 3 and 4, respectively, according to the teachings of this disclosure.

Referring to FIG. 5, depicted is a schematic diagram of a synchronous buck SMPS power circuit controlled by the control circuit shown in FIGS. 3 and 4, according to the teachings of this disclosure. A synchronous buck SMPS power circuit, generally represented by the numeral 206, may comprise a power source 540, e.g., battery, a series pass switch 544, e.g., power field effect transistor; a shunt switch 546, e.g., power field effect transistor; a power inductor 542, a load capacitor 556 for smoothing alternating current (AC) ripple from the desired direct current (DC) output, a current sensor 548, and load voltage divider resistors 552 and 554. Power source commons or grounds 550 are also indicated in FIG. 5.

Operation begins when a voltage feedback signal at node 320 is below a reference voltage at node 326. The voltage feedback signal at node 320 represents the value of the regulated output voltage. When this condition is true, operation is enabled. Load current may be determined with the current sensor resistor 548, e.g., a current-to-voltage converter.

In accordance with the teachings of this disclosure, during steady-state operation, or during small perturbations of the system, switches 544 and 546 are modulated by a fixed frequency PWM controller, e.g., PWM error generator 312 (see FIGS. 3 and 4). During dynamic conditions, switches 544 and 546 are asynchronously controlled by the fast hysteretic control 310. This fast hysteretic control contains the deviation to a predefined level. The slower PWM control loop then drives the error or deviation to substantially zero.

Figure 6:
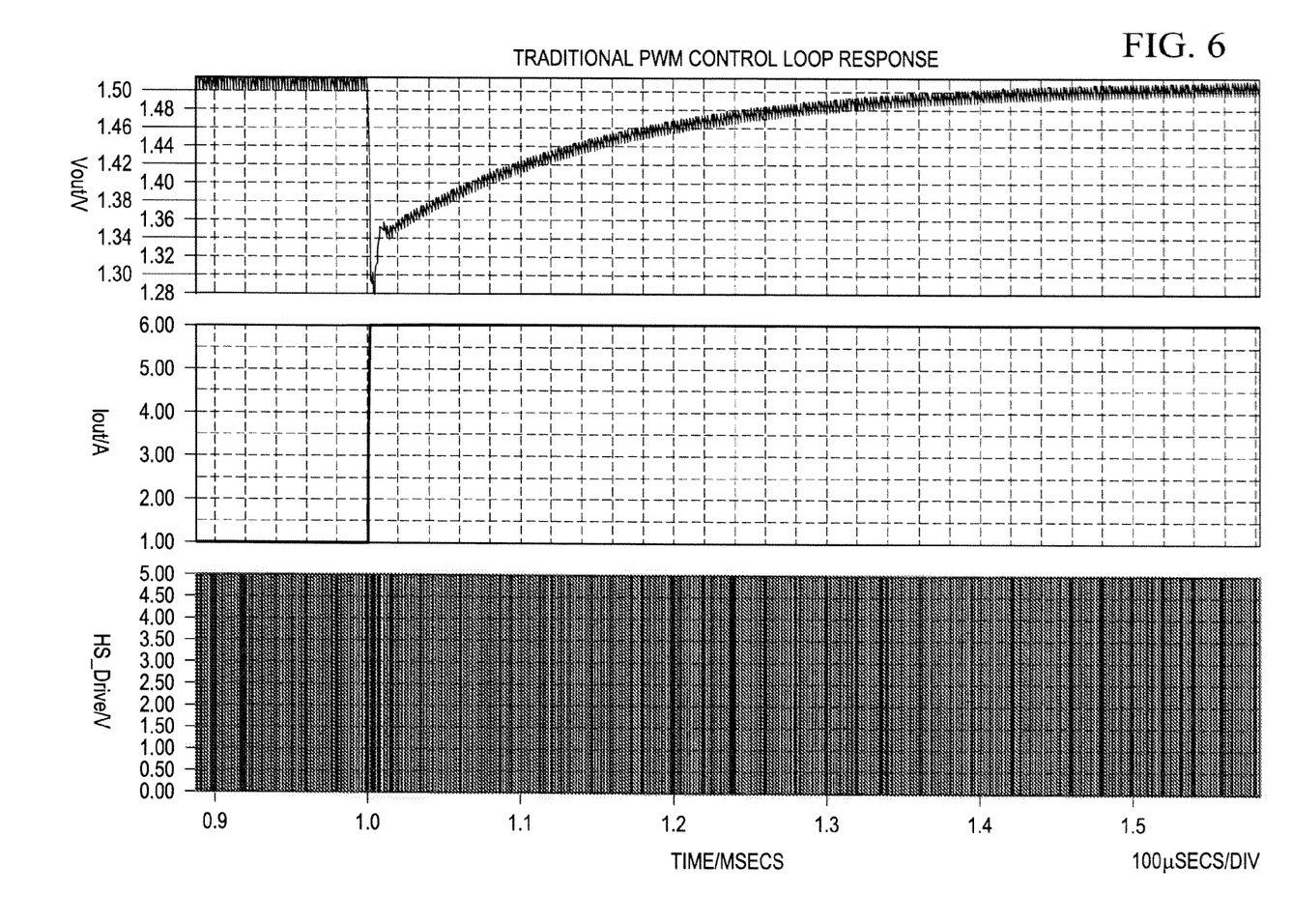
FIG. 6 illustrates a graph of a SMPS response using only a PWM control loop to a disturbance comprising a significant increase in load.
Figure 7:
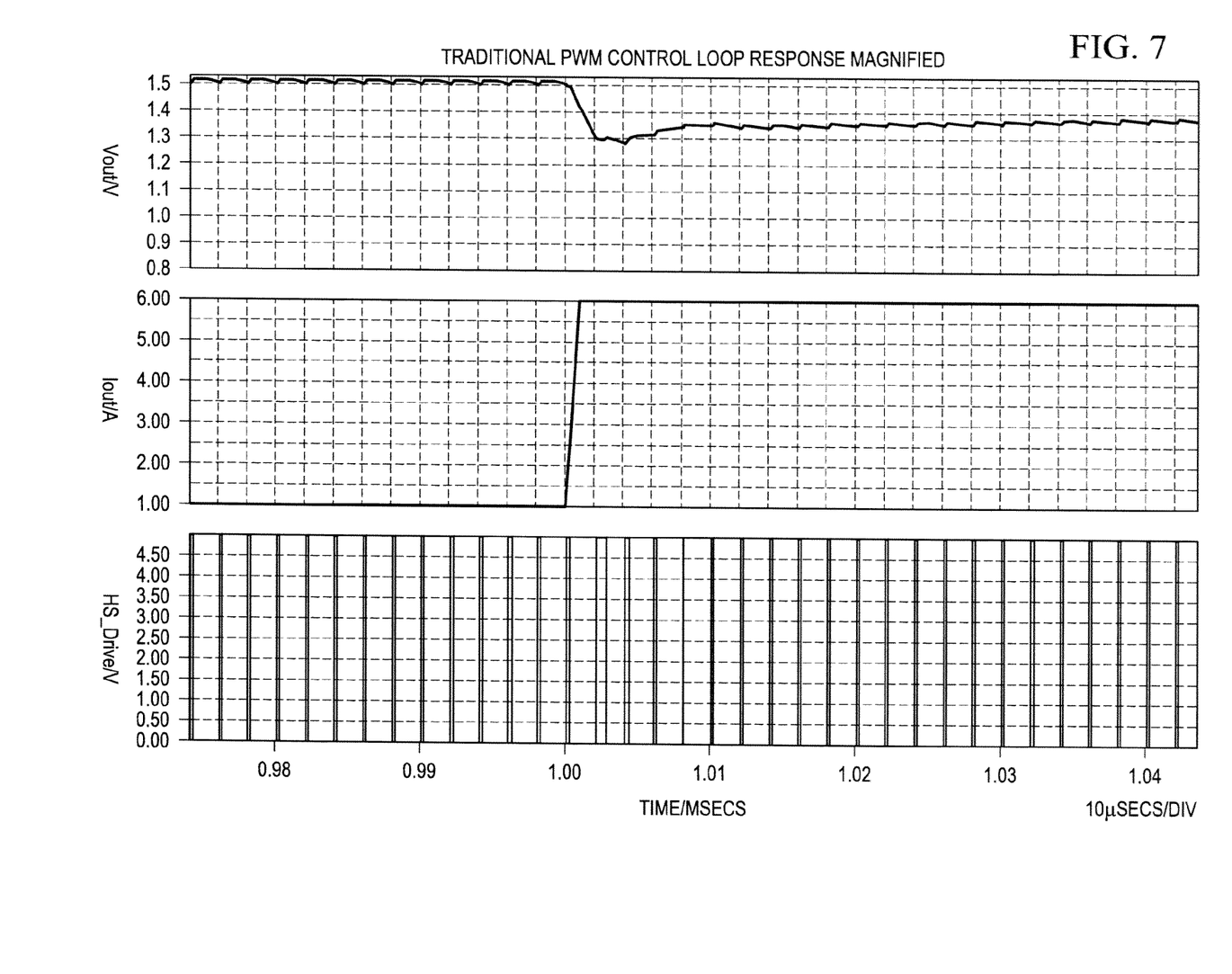
FIG. 7 illustrates a magnified time axis of the graph shown in FIG. 6.

Referring to FIGS. 6 and 7, depicted is a graph of a SMPS response using only a PWM control loop to a disturbance comprising a significant increase in load, and a magnified time axis thereof. Specifically, the disturbance depicted is an increase in load current. The load step occurs at a rate faster than the bandwidth of the PWM control loop. As prior technology suggests, increasing the bandwidth of the control loop can marginally improve the deviation, but the SMPS system will loose phase margin and increase the risk of instability. In addition, it can be argued that dual edge modulation techniques inherently can not react at twice the rate of a traditional PWM control loop as suggested because both edges are controlled by a single error signal.

Figure 8:
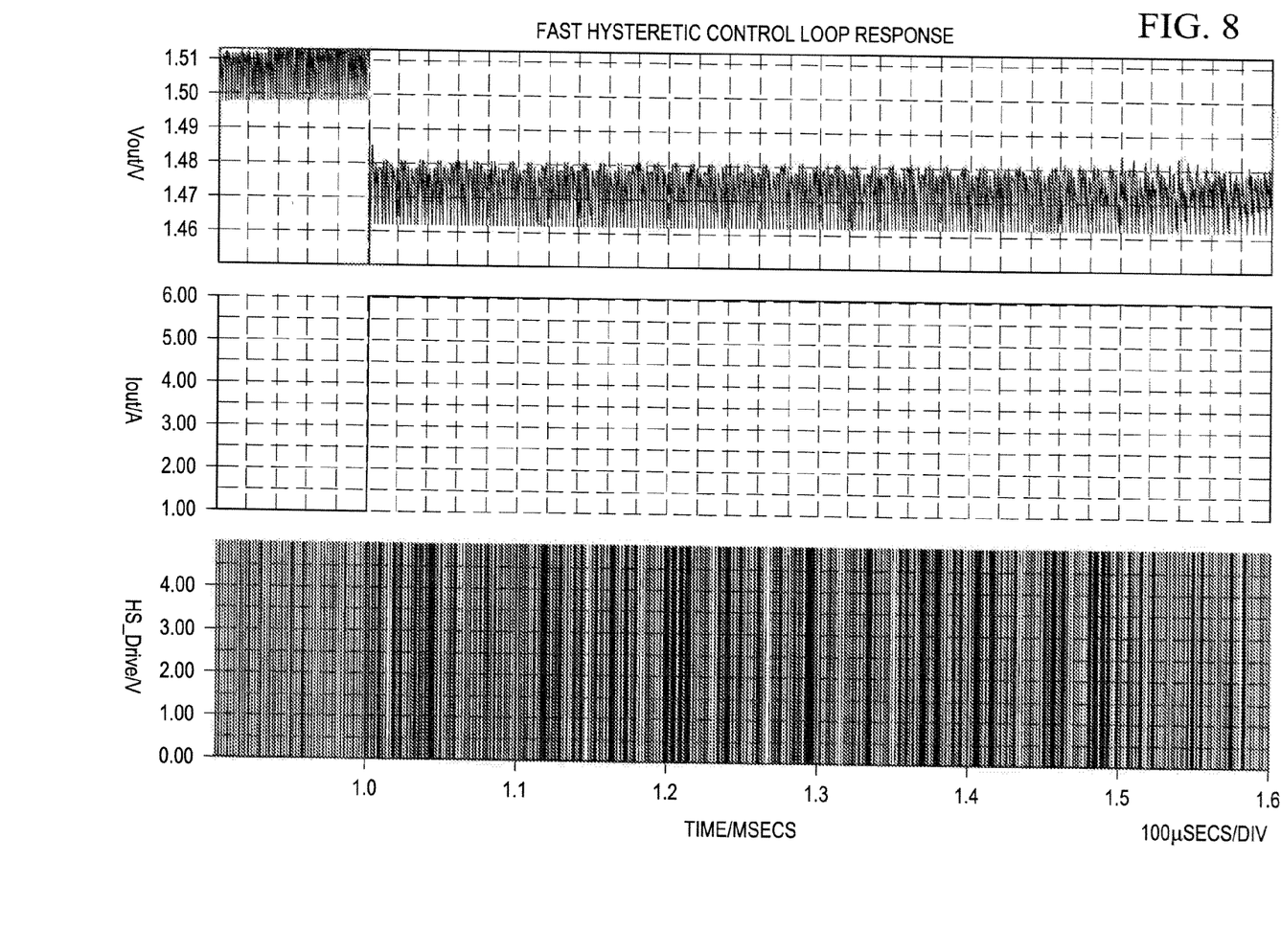
FIG. 8 illustrates a graph of a SMPS response using a fast outer hysteretic control in combination with the PWM control loop to a disturbance comprising a significant increase in load.
Figure 9:
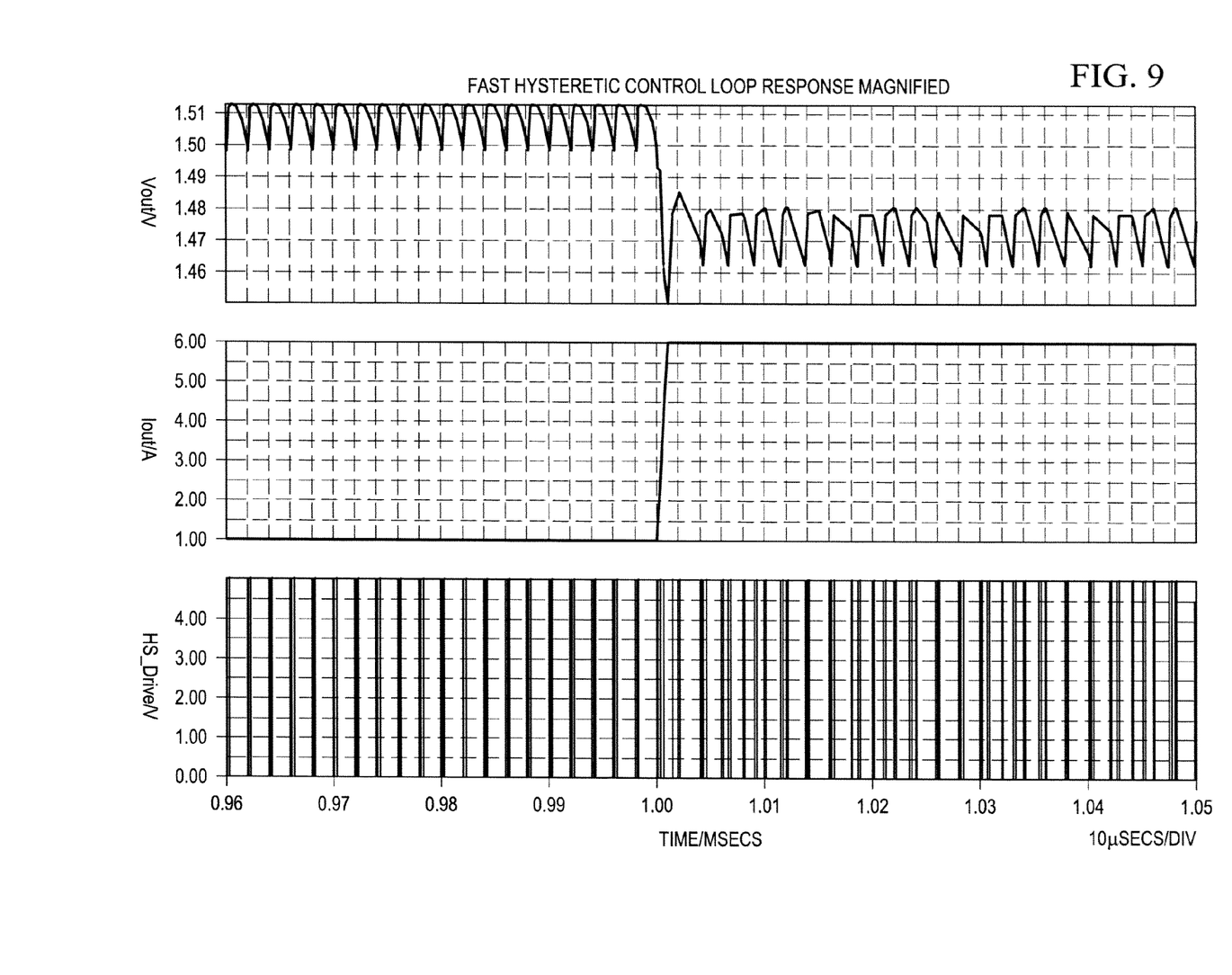
FIG. 9 illustrates a magnified time axis of the graph shown in FIG. 8.

Referring to FIGS. 8 and 9, depicted is a graph of a SMPS response using a fast outer hysteretic control in combination with the PWM control loop to a disturbance comprising a significant increase in load, and a magnified time axis thereof. Specifically, the disturbance depicted is an increase in load current. The load step occurs at a rate faster than the bandwidth of the PWM control loop. The peak deviation from the set-point is reduced by approximately fifty percent.

Figure 10:
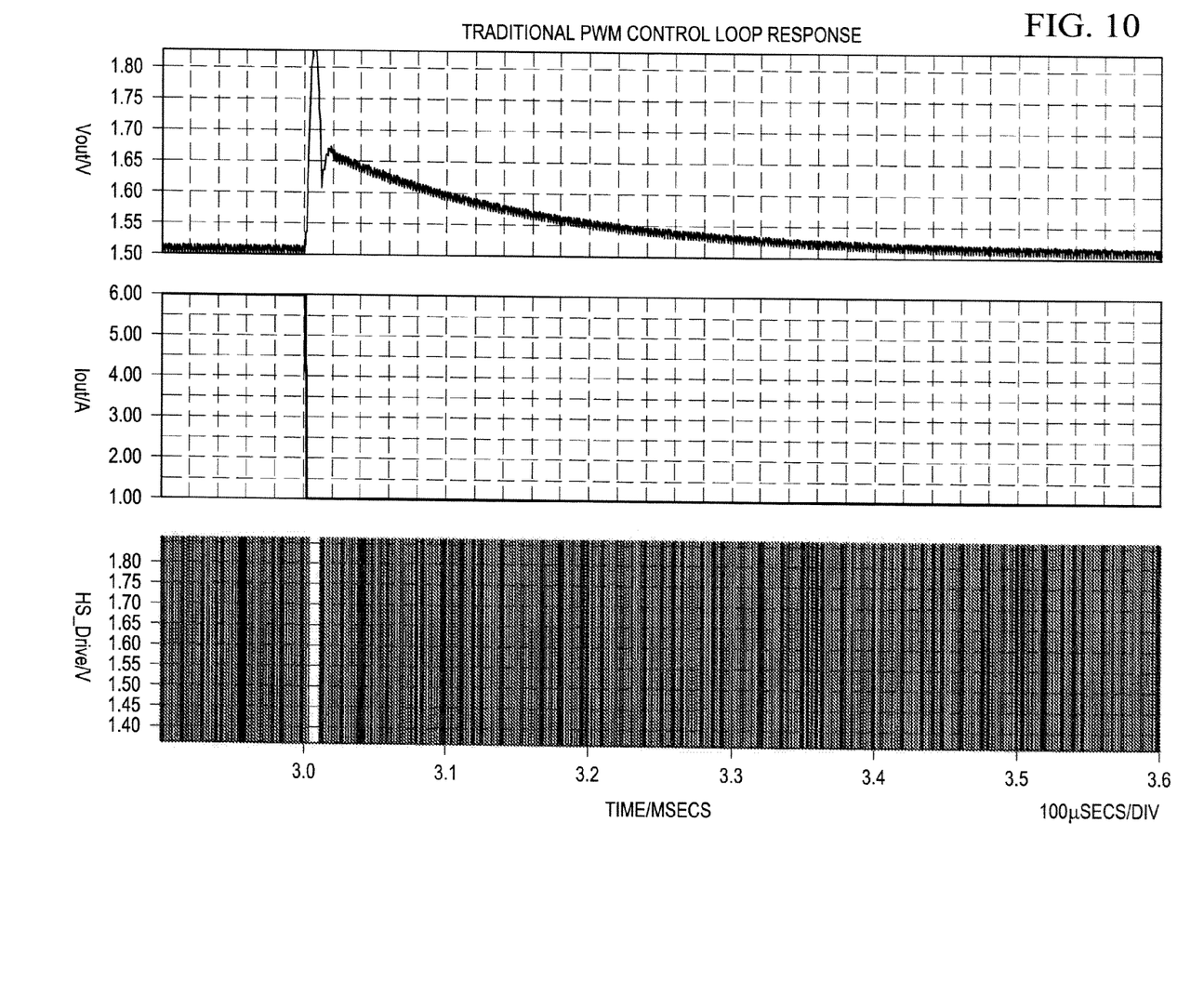
FIG. 10 illustrates a graph of a SMPS response using only a PWM control loop to a disturbance comprising a significant decrease in load.
Figure 11:
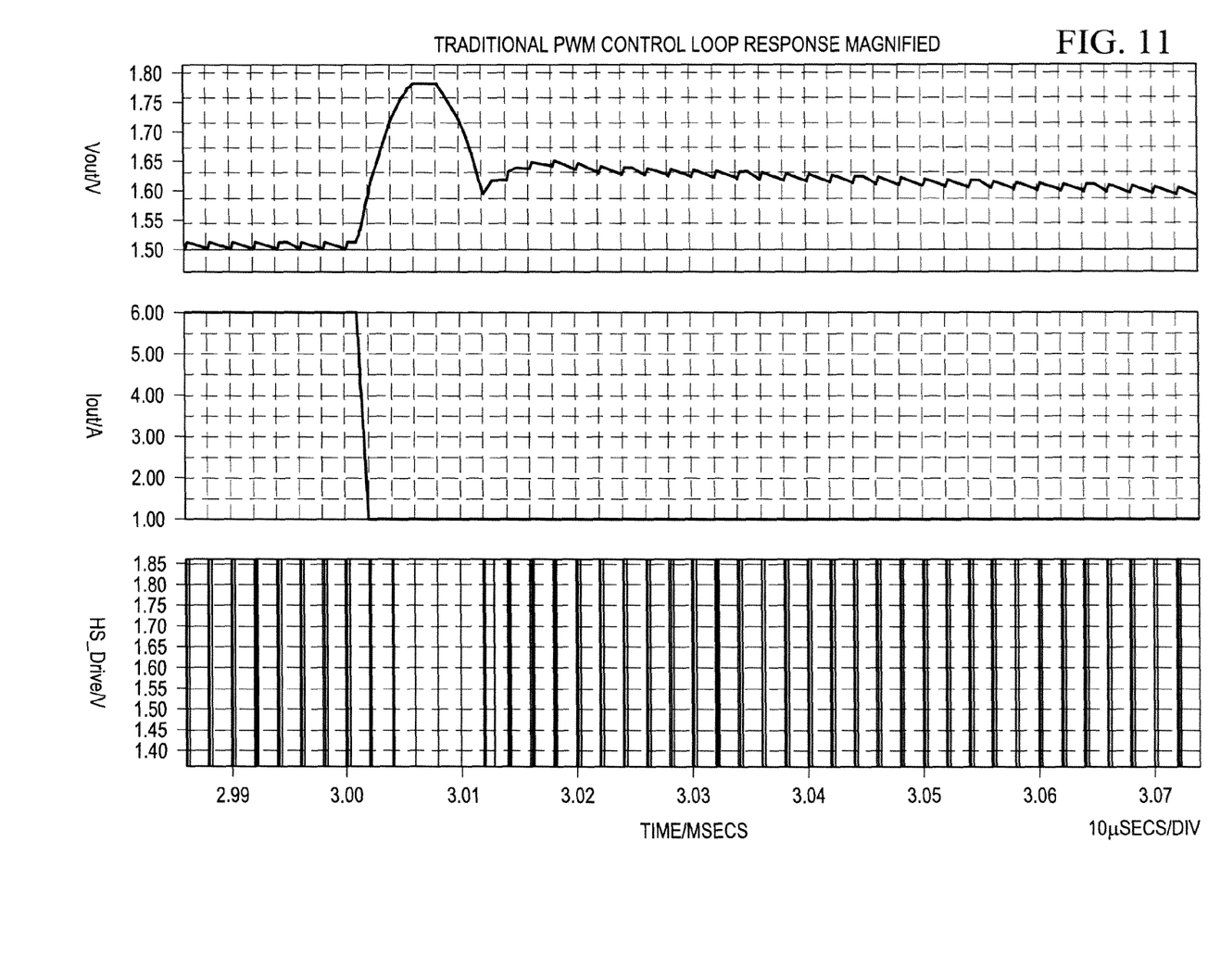
FIG. 11 illustrates a magnified time axis of the graph shown in FIG. 10.

Referring to FIGS. 10 and 11, depicted is a graph of a SMPS response using only a PWM control loop to a disturbance comprising a decrease in load current, and a magnified time axis thereof. The load step occurs at a rate faster than the bandwidth of the PWM control loop.

Figure 12:
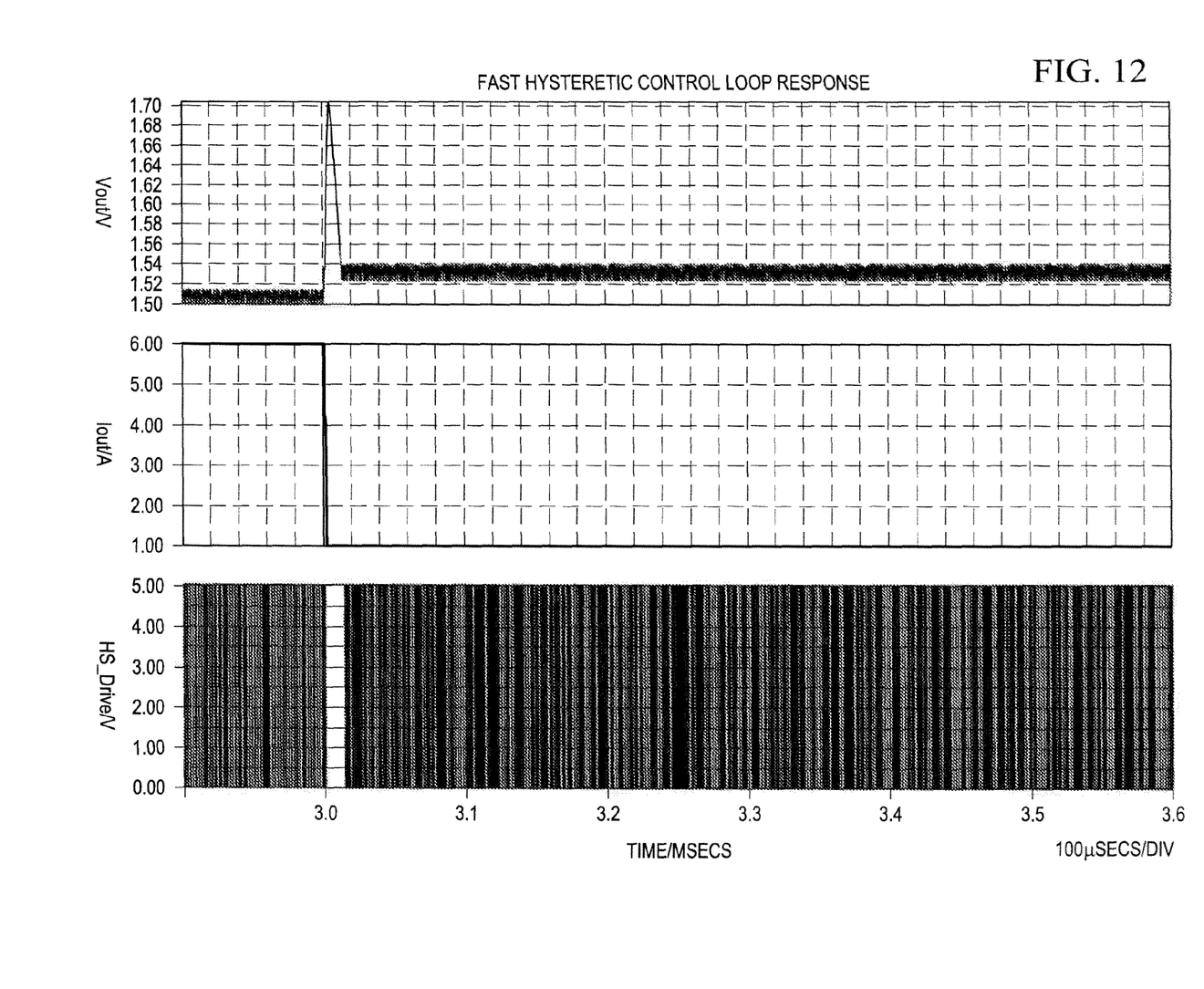
FIG. 12 illustrates a graph of a SMPS response using a fast outer hysteretic control in combination with the PWM control loop to a disturbance comprising a significant decrease in load.
Figure 13:
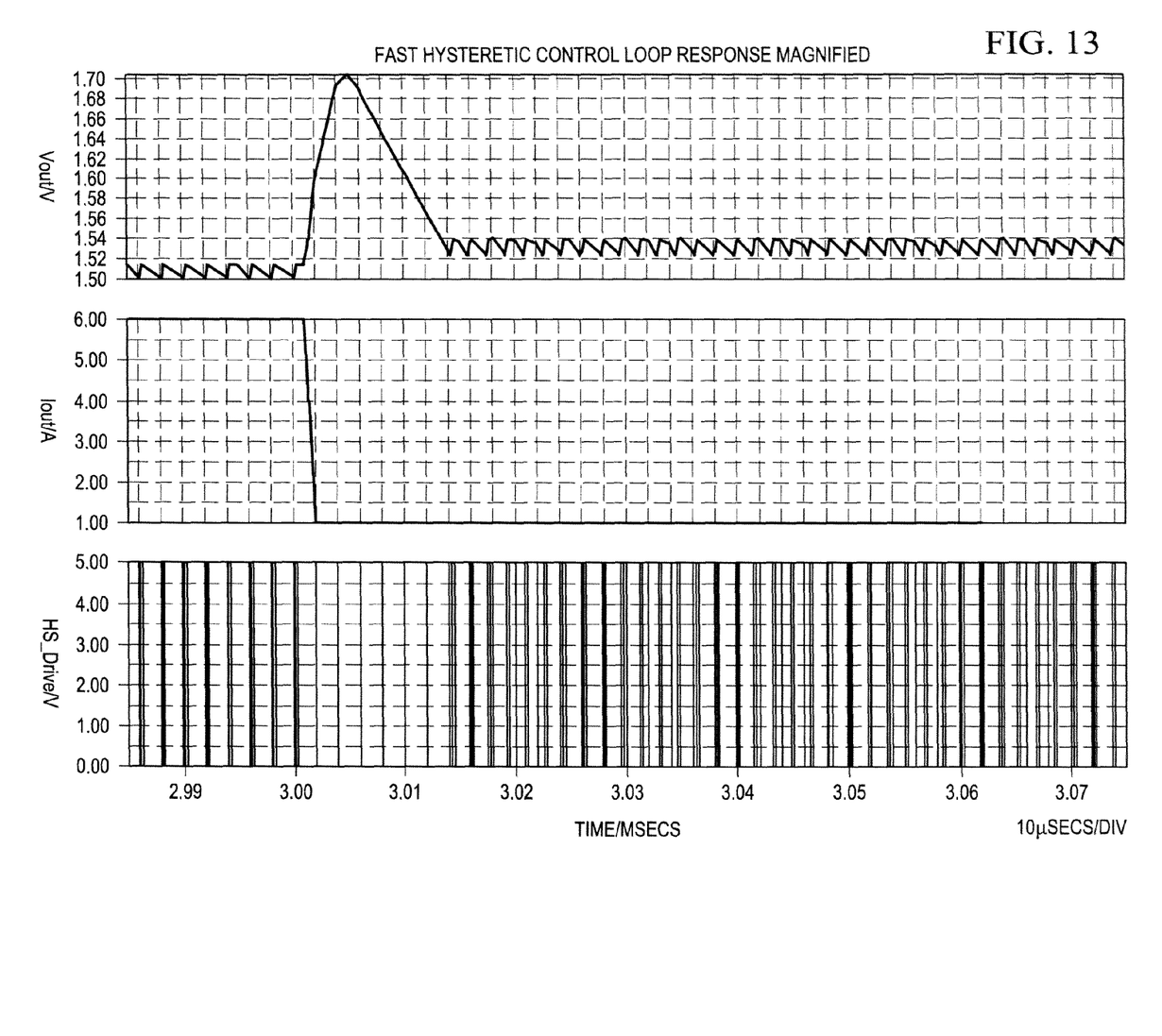
FIG. 13 illustrates a magnified time axis of the graph shown in FIG. 12.

Referring to FIGS. 12 and 13, depicted is a graph of a SMPS response using a fast outer hysteretic control in combination with the PWM control loop to a disturbance comprising a decrease in load, and a graph having a magnified time axis thereof. The load step occurs at a rate faster than the bandwidth of the PWM control loop. In this instance, the fast outer hysteretic control forces both switches off (see FIG. 5, transistors 544 and 546) in the presence of a positive deviation on the feedback signal. This increase has two effects.

First, by forcing the HS drive off, no additional or unwanted energy is stored in the inductor. Second, by forcing the LS drive off, the forcing function or voltage across the inductor is increased causing a faster decay in any stored energy. The peak deviation from the set point is reduced by 50%, approximately. Therefore, the combination of a traditional peak current mode PWM control in paralleled with a fast outer hysteretic control minimizes deviation from a set-up in the presence of an outside disturbance.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A switch mode power supply (SMPS) controller using hysteretic control in combination with pulse-width modulation (PWM) control, said controller comprising:

a hysteretic control circuit having a first input coupled to a reference voltage, a second input coupled to a feedback voltage representing a load side output voltage of a switch mode power supply (SMPS), a first output for controlling a high side hysteretic demand, and a second output for controlling a low side hysteretic disable;

a PWM error generator having a third input coupled to the reference voltage, a fourth input coupled to the feedback voltage, a fifth input coupled to a current sense circuit, and a third output for controlling PWM demand; and a power circuit driver having a high side (HS) power control output, and a low side (LS) power control output, the HS and LS power control outputs are adapted to drive power switches of a switch mode power supply (SMPS), the third output of the PWM error generator is coupled to the power circuit driver for control thereof, and the first and second outputs of the hysteretic control circuit are coupled to the power circuit driver for further control thereof;

the PWM error generator third output controls the power circuit driver to make the feedback voltage substantially equal to the reference voltage unless a difference between the feedback voltage and the reference voltage is greater than at least a predetermined value, wherein if the feedback voltage is greater than the reference voltage by at least the predetermined hysteretic value, then the hysteretic control circuit forces the HS and LS power control outputs to an off-state, if the feedback voltage is less than the reference voltage by at least the predetermined hysteretic value, then the hysteretic control circuit turns on the HS power control output and turns off the LS power control output, and otherwise the PWM error generator controls the HS and LS power control outputs so as to force the difference between the reference voltage and the feedback voltage to substantially zero over a certain time period.

2. The SMPS controller according to claim 1, wherein when the difference between the reference voltage and the feedback voltage is substantially zero, the PWM error generator controls the HS and LS power control outputs based upon current values received at the fifth input of the PWM error generator.

3. The SMPS controller according to claim 1, wherein the power switches of the SMPS are power field effect transistors.

4. The SMPS controller according to claim 1, wherein the current sense circuit comprises:
a current-to-voltage converter having a input coupled to a current sensor located on a power source side of the SMPS; and
a voltage output coupled to the fifth input of the PWM error generator.

5. The SMPS controller according to claim 1, wherein the hysteretic control circuit comprises first and second hysteretic comparators.

6. The SMPS controller according to claim 1, wherein the PWM error generator comprises:
an operational amplifier having a first input coupled to the reference voltage, a second input and an output representing the difference between the reference voltage and a voltage on the second input;
a compensation network having an input coupled to the feedback voltage and an output coupled to the second input of the operational amplifier, wherein the output of the operational amplifier represents the difference between the reference voltage and the compensated feedback voltage from the compensation network; and
a hysteretic comparator having a first input coupled to the output of the voltage comparator, a second input coupled to the current sense circuit through a summing node, and an output coupled to a PWM generator that is coupled to the power circuit driver, wherein the summing node adds a perturbation signal to a signal from the current sense circuit.

7. A method for controlling a switch mode power supply (SMPS) using hysteretic control in combination with pulse-width modulation (PWM) control, said method comprising the steps of:
determining a voltage difference between a reference voltage and a feedback voltage with a hysteretic control circuit and a PWM error generator, the feedback voltage being representative of an output voltage of a switch mode power supply (SMPS);
controlling high side (HS) and low side (LS) power switches of the SMPS with the PWM error generator when the voltage difference within a predetermined hysteretic window, and
if the voltage difference is outside said predetermined window and greater than the reference voltage then turning off the HS and LS drive signal, and
if the voltage difference is outside said predetermined window and smaller than the reference voltage then turning on the HS drive signal and turning off the LS drive signal.

8. The method according to claim 7, wherein the predetermined hysteretic window is determined by two hysteretic comparators.

9. The method according to claim 7, further comprising the step of controlling the power switches of the SMPS with the PWM error generator based upon input current when the voltage difference is substantially zero.

10. The method according to claim 9, wherein the input current is determined by a current-to-voltage converter.

* * * * *